US011904804B2

United States Patent
Morosawa et al.

(10) Patent No.: US 11,904,804 B2
(45) Date of Patent: Feb. 20, 2024

(54) VEHICLE CONTROL DEVICE, VEHICLE CONTROL METHOD, AND RECORDING MEDIUM

(71) Applicant: HONDA MOTOR CO., LTD., Tokyo (JP)

(72) Inventors: Ryo Morosawa, Wako (JP); Haisong Liu, Wako (JP); Akira Nakajima, Wako (JP); Kenji Okuma, Wako (JP); Hiroaki Maruyama, Wako (JP); Yoshikazu Matsuo, Wako (JP); Shuto Higashi, Wako (JP); Fumiaki Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 338 days.

(21) Appl. No.: 17/197,761

(22) Filed: Mar. 10, 2021

(65) Prior Publication Data

US 2021/0291781 A1 Sep. 23, 2021

(30) Foreign Application Priority Data

Mar. 18, 2020 (JP) .................................. 2020-047790

(51) Int. Cl.
*B60R 25/01* (2013.01)
*B60R 25/20* (2013.01)
(Continued)

(52) U.S. Cl.
CPC ............. *B60R 25/01* (2013.01); *B60R 25/20* (2013.01); *B60R 25/30* (2013.01); *E05F 15/75* (2015.01);
(Continued)

(58) Field of Classification Search
CPC ......... B60R 25/01; B60R 25/20; B60R 25/30; E05F 15/75; E05Y 2400/45; E05Y 2400/86
See application file for complete search history.

(56) References Cited

U.S. PATENT DOCUMENTS

2014/0300461 A1* 10/2014 Stark ...................... G08B 21/02
340/457
2014/0333769 A1* 11/2014 Shibuya .................. G06V 20/53
348/148
(Continued)

FOREIGN PATENT DOCUMENTS

JP       H10-110562 A      4/1998
JP       10278788 A   *  10/1998
(Continued)

OTHER PUBLICATIONS

Machine Translation of Tomohito's reference (JP-2009199109-A) (Year: 2009).*
Machine Translation of Akira's reference (JP-10278788-A) (Year: 1998).*
1 Chinese Office Action dated Jun. 1, 2022, English translation included, 14 pages.
(Continued)

*Primary Examiner* — Tarek Elarabi
(74) *Attorney, Agent, or Firm* — Rankin, Hill & Clark LLP

(57) ABSTRACT

A vehicle control device includes: an on-vehicle-user-number recognizing unit that performs recognition of an on-vehicle-user-number, and stores the on-vehicle-user-number in a storage unit, the on-vehicle-user-number being a number of users who have got on a vehicle; an off-vehicle-user-number recognizing unit that recognizes an off-vehicle-user-number, the off-vehicle-user-number being a number of the users who have got off the vehicle after the recognition of the on-vehicle-user-number by the on-vehicle-user-number recognizing unit; and a power door control unit that causes at least one power door to perform closing operation when the on-vehicle-user-number stored in the storage unit equals (Continued)

the off-vehicle-user-number recognized by the off-vehicle-user-number recognizing unit, the at least one power door being a power door that the user has used at a time of getting off the vehicle.

11 Claims, 12 Drawing Sheets

(51) Int. Cl.
*E05F 15/75* (2015.01)
*B60R 25/30* (2013.01)
(52) U.S. Cl.
CPC ....... *E05Y 2400/45* (2013.01); *E05Y 2400/86* (2013.01)

(56) References Cited

U.S. PATENT DOCUMENTS

2015/0348344 A1* 12/2015 Rettig .................... G06F 3/017
340/5.61
2019/0071916 A1 3/2019 Dusina et al.

FOREIGN PATENT DOCUMENTS

| JP | 2003-138817 | | 5/2003 |
| JP | 2009-199109 | | 9/2009 |
| JP | 2009199109 A | * | 9/2009 |

OTHER PUBLICATIONS

Japanese Office Action dated Aug. 1, 2023 issued in corresponding Japanese application No. 2020-047790; English machine translation included (7 pages).

* cited by examiner

VEHICLE CONTROL DEVICE, VEHICLE CONTROL METHOD, AND RECORDING MEDIUM

INCORPORATION BY REFERENCE

The present application claims priority under 35 U.S.C. § 119 to Japanese Patent Application No. 2020-047790 filed on Mar. 18, 2020. The content of the application is incorporated herein by reference in its entirety.

BACKGROUND OF THE INVENTION

Field of the Invention

The present invention relates to a vehicle control device, a vehicle control method, and a recording medium.

Description of the Related Art

Conventionally, a vehicle entry system using image authentication has been proposed (see, for example, Japanese Patent Laid-Open No. 2003-138817). The entry system is provided with peripheral monitoring means for detecting a person approaching the vehicle using radio waves, ultrasonic waves, infrared rays, or a peripheral image of the vehicle, and when it detects a person approaching the vehicle, it photographs the person to execute identity confirmation by his/her iris. Then, the entry system unlocks the door when the person is confirmed to be the person himself/herself.

According to the conventional entry system, the user can unlock the door only by approaching the vehicle, so that the load on the user when getting on the vehicle can be reduced. Then, in order to improve the usability for the user to use the vehicle, it is desirable to reduce the load on the user not only when the user gets on the vehicle but also when the user gets off the vehicle.

The present invention has been made with respect to such a background, and an object of the present invention is to provide a vehicle control device, a vehicle control method, and a recording medium capable of reducing the load on a user when the user gets off a vehicle.

SUMMARY OF THE INVENTION

As a first aspect for achieving the object, there is provided a vehicle control device that controls closing operation of a power door provided in a vehicle, the vehicle control device including: an on-vehicle-user-number recognizing unit that performs recognition of an on-vehicle-user-number, and stores the on-vehicle-user-number in a storage unit, the on-vehicle-user-number being a number of users who have got on the vehicle; an off-vehicle-user-number recognizing unit that recognizes an off-vehicle-user-number, the off-vehicle-user-number being a number of the users who have got off the vehicle after the recognition of the on-vehicle-user-number by the on-vehicle-user-number recognizing unit; and a power door control unit that causes at least one power door to perform closing operation when the on-vehicle-user-number stored in the storage unit equals the off-vehicle-user-number recognized by the off-vehicle-user-number recognizing unit, the at least one power door being a power door that the user has used at a time of getting off the vehicle.

Here, the power door means a door that performs closing operation by an electric actuator, a hydraulic actuator, or the like.

The vehicle control device in the vehicle having a plurality of the power doors may include a door-getting-off-expected-number setting unit that specifies an expected-getting-off-door for each user who is on the vehicle so that the door-getting-off-expected-number setting unit sets a door-getting-off-expected-number, for each expected-getting-off-door, the expected-getting-off-door being one of the power doors that the individual user is expected to use when getting off the vehicle, the door-getting-off-expected-number being a number of the users who are expected to use the individual expected-getting-off-door, wherein: the off-vehicle-user-number recognizing unit recognizes a number of the users who have got off the vehicle, separately for the individual power door used when the individual users get off the vehicle; and for the individual expected-getting-off-door, the power door control unit performs an individual power door closing operation process when a number of the users who have got off the vehicle from the expected-getting-off-door equals the door-getting-off-expected-number, the individual power door closing operation process causing the individual expected-getting-off-door to perform closing operation, the number of the users who have got off the vehicle being recognized by the off-vehicle-user-number recognizing unit.

The vehicle control device may include an off-vehicle-user-situation recognizing unit that recognizes a situation of the user who has got off the vehicle, wherein the power door control unit causes the expected-getting-off-door to perform closing operation in the individual power door closing operation process, when a number of the users who have got off the vehicle from the expected-getting-off-door, which is recognized by the off-vehicle-user-number recognizing unit, equals the door-getting-off-expected-number, and when the off-vehicle-user-situation recognizing unit recognizes that the user who has got off the vehicle from the expected-getting-off-door turns his/her back to the vehicle away from the vehicle by a predetermined distance or more.

The vehicle control device may include an off-vehicle-user-situation recognizing unit that recognizes a situation of the user who has got off the vehicle, wherein the power door control unit prohibits closing operation of the expected-getting-off-door in the individual power door closing operation process, when a number of the users who have got off the vehicle from the expected-getting-off-door, which is recognized by the off-vehicle-user-number recognizing unit, equals the door-getting-off-expected-number, and when the off-vehicle-user-situation recognizing unit recognizes that the user who has got off the vehicle from the expected-getting-off-door faces the vehicle.

The vehicle control device in the vehicle having seats in a third and subsequent rows, the vehicle including a rear-seat power door, which is the power door corresponding to the seats in the third and subsequent rows and the second row, may include a user-action recognizing unit that recognizes an action of the user who is on the vehicle, wherein the power door control unit causes the rear-seat power door to perform closing operation when the user-action recognizing unit recognizes that none of the users who are on the seats in the third and subsequent rows get off the vehicle from the time when the user-action recognizing unit recognizes that all the users who have been on the seats in the second row get off the vehicle to the time when a predetermined time elapses.

The vehicle control device may include a getting-off-intention recognizing unit that recognizes getting-off-intention of the user who is on the vehicle, wherein the power door control unit does not cause the rear-seat power door to perform closing operation while the getting-off-intention recognizing unit recognizes getting-off-intention of the user who is on the seats in the third and subsequent rows, even when the predetermined time elapses.

The vehicle control device in the vehicle having seats in a third and subsequent rows, the vehicle including a rear-seat power door, which is the power door corresponding to the seats in the third and subsequent rows and the second row, may include a user-action recognizing unit that recognizes an action of the user who is on the vehicle, wherein the power door control unit causes the rear-seat power door to perform closing operation, when the user-action recognizing unit recognizes that all the users on the seats in the second row have got off the vehicle, and then the user-action recognizing unit recognizes that any of the users on the seats in the third and subsequent rows makes a gesture instructing closing operation of the rear-seat power door.

In the vehicle control device, the power door control unit may be configured to lock the power door that the power door control unit has caused to perform closing operation.

As a second aspect for achieving the above object, there is provided a vehicle control method that is executed by a computer to control closing operation of a power door provided in a vehicle, the method including: an on-vehicle-user-number recognizing step that performs recognition of an on-vehicle-user-number, and stores the on-vehicle-user-number in a storage unit, the on-vehicle-user-number being a number of users who have got on the vehicle; an off-vehicle-user-number recognizing step that recognizes an off-vehicle-user-number, the off-vehicle-user-number being a number of the users who have got off the vehicle after the recognition of the on-vehicle-user-number by the on-vehicle-user-number recognizing step; and a power door control step that causes at least one power door to perform closing operation when the on-vehicle-user-number stored in the storage unit equals the off-vehicle-user-number recognized by the off-vehicle-user-number recognizing step, the at least one power door being a power door that the users have used at a time of getting off the vehicle.

As a third aspect for achieving the above object, there is provided a non-transient recording medium on which a vehicle control program for controlling closing operation of a power door provided in a vehicle is recorded, the program causing a computer to function as: an on-vehicle-user-number recognizing unit that performs recognition of an on-vehicle-user-number, and stores the on-vehicle-user-number in a storage unit, the on-vehicle-user-number being a number of users who have got on the vehicle; an off-vehicle-user-number recognizing unit that recognizes an off-vehicle-user-number, the off-vehicle-user-number being a number of the users who have got off the vehicle after the recognition of the on-vehicle-user-number by the on-vehicle-user-number recognizing unit; and a power door control unit that causes at least one power door to perform closing operation when the on-vehicle-user-number stored in the storage unit equals the off-vehicle-user-number recognized by the off-vehicle-user-number recognizing unit, the at least one power door being a power door that the user has used at a time of getting off the vehicle.

According to the vehicle control device, when the on-vehicle-user-number, which the on-vehicle-user-number recognizing unit recognizes and stores in the storage unit, equals the off-vehicle-user-number, which the off-vehicle-user-number recognizing unit recognizes, the power door control unit causes at least one power door, used when the user has got off, to perform closing operation. As a result, when all the users who have been on the vehicle get off, the operation for closing the power door is reduced, so that the load on the user at a time of getting off the vehicle can be reduced.

DETAILED DESCRIPTION OF THE PREFERRED EMBODIMENTS

1. Vehicle Configuration

Figure 1:
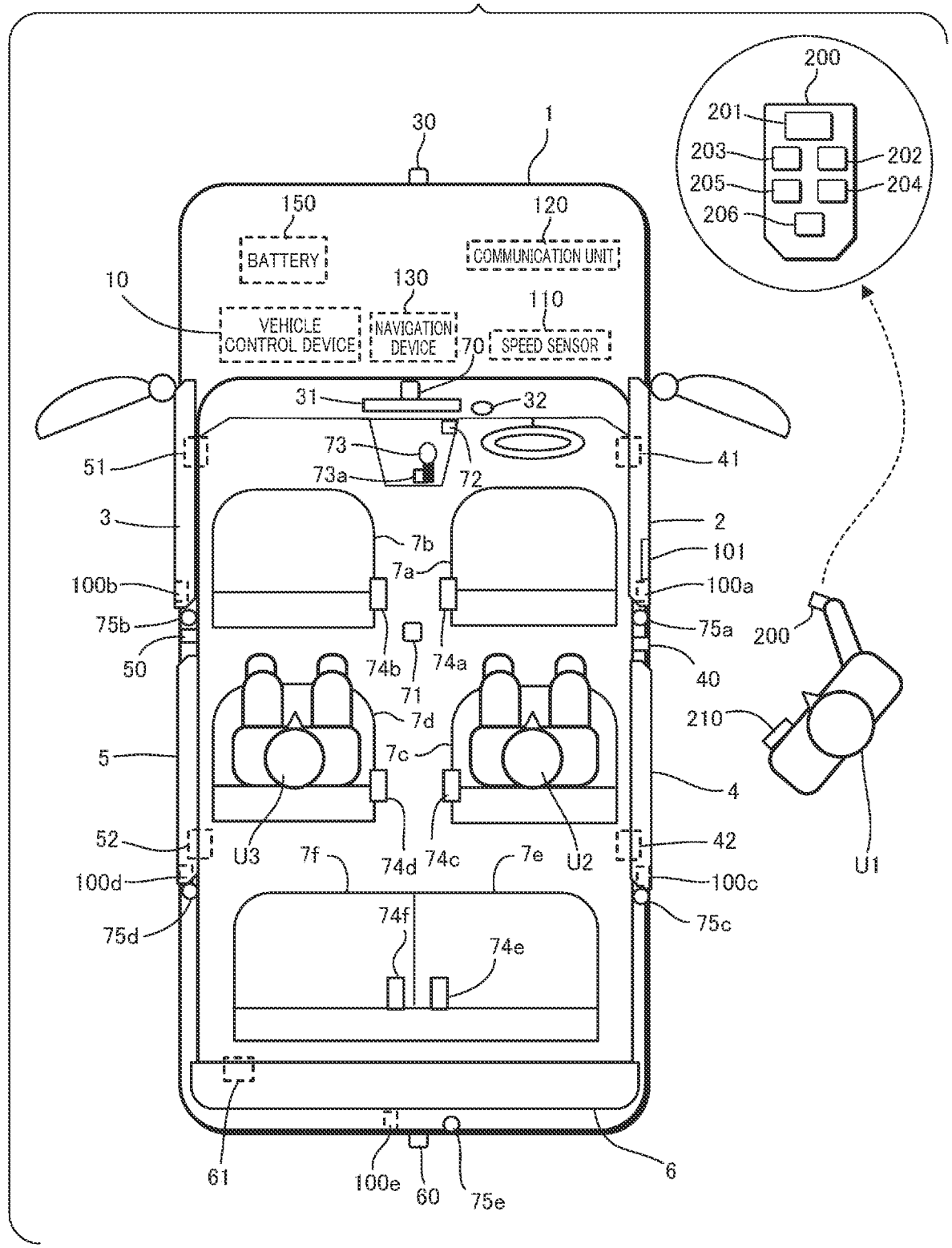
FIG. 1 is a configuration diagram of a vehicle equipped with a vehicle control device.

A configuration of a vehicle 1 equipped with a vehicle control device 10 of the present embodiment is described below with reference to FIG. 1. As shown in FIG. 1, the vehicle 1 is a passenger car having a seating capacity of 6 people, and includes a driver's seat 7a, a front passenger seat 7b, a second row right seat 7c, a second row left seat 7d, a third row right seat 7e, and a third row left seat 7f. The respective seats 7a to 7f are provided with seatbelt switches 74a to 74f (not shown) for detecting whether each seatbelt is fastened.

FIG. 1 shows a situation in which a user U2 is on the second row right seat 7c and a user U3 is on the second row left seat 7d. In the following, the second row right seat 7c and the second row left seat 7d are also collectively referred to as second row seats, and the third row right seat 7e and the third row left seat 7f are also collectively referred to as third row seats.

The vehicle 1 includes a right power hinge door 2, a left power hinge door 3, a right power slide door 4, a left power slide door 5, and a power tailgate 6. The right power hinge door 2, the left power hinge door 3, the right power slide door 4, and the left power slide door 5 each correspond to a power door of the present invention. The right power slide door 4 and the left power slide door 5 are power doors corresponding to the second row seats and the third row seats.

The door knob of the right power hinge door 2 is provided with a door touch sensor 101, and the user U1 who carries a portable key 200 of the vehicle 1 can unlock the doors 2 to 6 of the vehicle 1 by touching a door touch sensor 101.

The right power hinge door 2 includes a right PHD (Power Hinge Door) drive unit 41 that drives the right power hinge door 2 by an electric actuator (not shown) for opening and closing, and the left power hinge door 3 includes a left PHD drive unit 51 that drives the left power hinge door 3 by an electric actuator for opening and closing. The right power slide door 4 includes a right PSD (Power Slide Door) drive unit 42 that drives the right power slide door 4 by an electric actuator for opening and closing, and the left power slide door 5 includes a left PSD drive unit 52 that drives the left power slide door 5 by an electric actuator for opening and closing. The power tailgate 6 includes a PTG (Power Tail Gate) drive unit 61 that drives the power tailgate 6 by an electric actuator for opening and closing.

A front camera 30 for photographing the front of the vehicle 1 is provided at the front part of the vehicle 1, and a rear camera 60 for photographing the rear of the vehicle 1 is provided at the rear part of the vehicle 1. A right side camera 40 for photographing the right side of the vehicle 1 is provided on the right side part of the vehicle 1, and a left side camera 50 for photographing the left side of the vehicle 1 is provided on the left side part of the vehicle 1.

The dashboard of the vehicle interior is provided with a front-seat camera 70 for photographing users who sit on the driver's seat 7a and the front passenger seat 7b, a display 31, and a speaker 32. On the ceiling of the vehicle interior, there is provided a rear-seat camera 71 for photographing users who sit on the second row right seat 7c, the second row left seat 7d, the third row right seat 7e, and the third row left seat 7f.

The respective doors 2 to 5 are provided with door switches 75a to 75d for detecting the opening and closing of the doors. The power tailgate 6 is also provided with a door switch 75e for detecting the opening and closing of the power tailgate 6. Furthermore, a power switch 72 for instructing on and off of a battery 150 and a shift switch 73a for detecting a shift position of a shift lever 73 are provided near the driver's seat 7a. When the battery 150 is on, power is supplied from the battery 150 to a load 151 (see FIG. 2), and when the battery 150 is off, the power supply from the battery 150 to the load is shut off. The load 151 includes an air conditioner (not shown), an electric motor, and the like provided in the vehicle 1.

Furthermore, the vehicle 1 includes: door lock mechanisms 100a to 100e for locking the respective doors 2 to 5 and the power tailgate 6; a speed sensor 110 for detecting the traveling speed of the vehicle 1; a communication unit 120 for communicating with a portable key 200, a user terminal 210, and the like; and a navigation device 130. The navigation device 130 has a GPS (Global Positioning System) sensor and map data (not shown), and executes route guidance to a destination based on the position of the vehicle 1 detected by the GPS sensor and the map data.

2. Vehicle Control Device Configuration

A configuration of the vehicle control device 10 is described below with reference to FIG. 2. The vehicle control device 10 includes an ECU (Electronic Control Unit) that is configured with a CPU (Central Processing Unit, which corresponds to the computer of the present invention and is not shown), a memory 80, an interface circuit (not shown), and the like, to control the operation of the vehicle 1.

The vehicle control device 10 receives input of images of the surroundings of the vehicle 1 taken by the front camera 30, the right side camera 40, the left side camera 50, and the rear camera 60. In addition, the vehicle control device 10 receives input of images of the vehicle interior taken by the front-seat camera 70 and the rear-seat camera 71.

Furthermore, the vehicle control device 10 receives input of: detection signals of the power switch 72, the shift switch 73a, the seatbelt switches 74a to 74f, and the door switches 75a to 75e; and lock detection signals for the respective doors 2 to 5 and the power tailgate 6 by door lock sensors (not shown) provided in the door lock mechanisms 100a to 100e.

In addition, the vehicle control device 10 receives input of: a touch detection signal by the door touch sensor 101; a speed detection signal of the speed sensor 110; and information on the current position of the vehicle 1 detected by the navigation device 130.

Control signals output from the vehicle control device 10 control the operation of: the right PHD drive unit 41; the right PSD drive unit 42; the left PHD drive unit 51; the left PSD drive unit 52; the PTG drive unit 61; the door lock mechanisms 100a-100e; and battery 150. In addition, the control signals output from the vehicle control device 10 control screen display of the display 31, and the sound (voice guidance, chime sound, and so on) output from the speaker 32. The vehicle control device 10 communicates with the portable key 200 carried by the user U1 and the user terminal 210 via the communication unit 120.

The CPU reads and executes a control program 81 of the vehicle control device 10 stored in the memory 80 to function as: a key authentication unit 11; an on-vehicle-user-number recognizing unit 12; an off-vehicle-user-number recognizing unit 13; a line-of-sight recognizing unit 14; a user-action recognizing unit 15; a getting-off-intention recognizing unit 16; a door-getting-off-expected-number setting unit 18; and an off-vehicle-user-situation recognizing unit 19; and a power door control unit 20. The control program includes the vehicle control program of the present invention. The memory 80 stores an authentication ID code 82 used when the portable key 200 authenticates the user U1. The CPU corresponds to a computer. The memory 80 corresponds to a recording medium. The control program 81 may be recorded on an external recording medium (flash memory, magnetic disk, optical disk, etc.) that can be read and written by a computer to be transferred from the external recording medium to the memory 80. The memory 80 and the external recording medium are non-transient tangible recording media.

A process executed by the on-vehicle-user-number recognizing unit 12 corresponds to an on-vehicle-user-number recognizing step in the vehicle control method of the present invention, and a process executed by the off-vehicle-user-number recognizing unit 13 corresponds to an off-vehicleuser-number recognizing step in the vehicle control method of the present invention. A process executed by the power door control unit 20 corresponds to a power door control step in the vehicle control method of the present invention.

As shown in FIG. 1, the key authentication unit 11 communicates with the portable key 200 via the communication unit 120 to receive an ID code from the mobile key 200 when the user U1 who carries the portable key 200 approaches the vehicle 1. Then, when the received ID code equals the authentication ID code 82 stored in the memory 80, the key authentication unit 11 permits the user U1 to use the vehicle 1. As a result, the user U1 can operate the vehicle 1.

As shown in FIG. 1, the portable key 200 includes: a lock-unlock button 201 for instructing lock and unlock of the vehicle 1; a right power hinge door button 202 for instructing opening and closing of the right power hinge door 2; a left power hinge door button 203 for instructing opening and closing of the left power hinge door 3; a right power slide door button 204 for instructing opening and closing of the right power slide door 4; a left power slide door button 205 for instructing opening and closing of the left power slide door 5; and a power tail gate button 206 for instructing the opening and closing of the power tailgate 6.

The user U1 can operate the lock-unlock button 201 of the portable key 200 to unlock the respective doors 2 to 6 of the vehicle 1 and get on the vehicle 1. In addition, the user U1 can operate the buttons 202 to 206 of the portable key 200 to instruct the vehicle 1 to open and close the power door. The user U1 who carries the portable key 200 and gets on the vehicle 1 turns on the power switch 72 to start the vehicle 1 and starts using the vehicle 1.

From the images taken by the right side camera 40 and the left side camera 50, the on-vehicle-user-number recognizing unit 12 recognizes an on-vehicle-user-number and stores it in the memory 80 (corresponding to the storage unit of the present invention). The on-vehicle-user-number is a number of users who have got on the vehicle 1 from any of the right power hinge door 2, the left power hinge door 3, the right power slide door 4, and the left power slide door 5. The on-vehicle-user-number recognizing unit 12 recognizes the on-vehicle-user-number for each power door used when the user gets on the vehicle.

Note that, from the images taken by the front-seat camera 70 and the rear-seat camera 71, the on-vehicle-user-number recognizing unit 12 may recognize the number of users in the vehicle interior of the vehicle 1 to recognize the on-vehicle-user-number. Alternatively, the on-vehicle-user-number recognizing unit 12 may recognize the on-vehicle-user-number, using both the images taken by the right side camera 40 and the left side camera 50, and the images taken by the front-seat camera 70 and the rear-seat camera 71. Still alternatively, the on-vehicle-user-number recognizing unit 12 may recognize the on-vehicle-user-number, using the detection signals of the door switches 75a-75d, the seatbelt switches 74a-74f, the door lock sensors provided in the door lock mechanisms 100a-100d.

After the on-vehicle-user-number recognizing unit 12 recognizes the on-vehicle-user-number, the off-vehicle-user-number recognizing unit 13 recognizes the user who has got off the vehicle from any of the power door from the images taken by the right side camera 40 and the left side camera 50, to recognize an off-vehicle-user-number that is the number of the users who have got off the vehicle 1, and stores it in the memory 80. The off-vehicle-user-number recognizing unit 13 recognizes the off-vehicle-user-number for each power door used when the user gets off the vehicle.

Note that, the off-vehicle-user-number recognizing unit 13 may recognize an action that the user in the vehicle interior of the vehicle 1 takes to get off, from the images taken by the front-seat camera 70 and the rear-seat camera 71, to recognize the off-vehicle-user-number. Alternatively, the off-vehicle-user-number recognizing unit 13 may recognize the off-vehicle-user-number, using both the images taken by the right side camera 40 and the left side camera 50, and the images taken by the front-seat camera 70 and the rear-seat camera 71. Still alternatively, the off-vehicle-user-number recognizing unit 13 may recognize the off-vehicle-user-number, using the detection signals of the door switches 75a to 75d, the seatbelt switches 74a to 74f, the door lock sensors provided in the door lock mechanisms 100a to 100d.

The line-of-sight recognizing unit 14 recognizes the line-of-sight direction of the user in the vehicle 1 from the user's face image taken by the front-seat camera 70 or the rear-seat camera 71. The user-action recognizing unit 15 recognizes the individual user's action from the moving image of the user taken by the front-seat camera 70 or the rear-seat camera 71 for the user in the vehicle 1. The user-action recognizing unit 15 recognizes, for example, a user's gesture, a change in body orientation, a movement orientation, and the like as user's actions.

The getting-off-intention recognizing unit 16 recognizes the individual user's getting-off-intention for the vehicle 1, based on the user's line-of-sight direction recognized by the line-of-sight recognizing unit 14 and the user's actions recognized by the user-action recognizing unit 15. Specifically, the getting-off-intention recognizing unit 16 recognizes the user's getting-off-intention when the line-of-sight recognizing unit 14 recognizes that the user's line of sight is directed to one of the power doors, and the user-action recognizing unit 15 recognizes the action of approaching the power door to which the user directs the line-of-sight.

Figure 3:
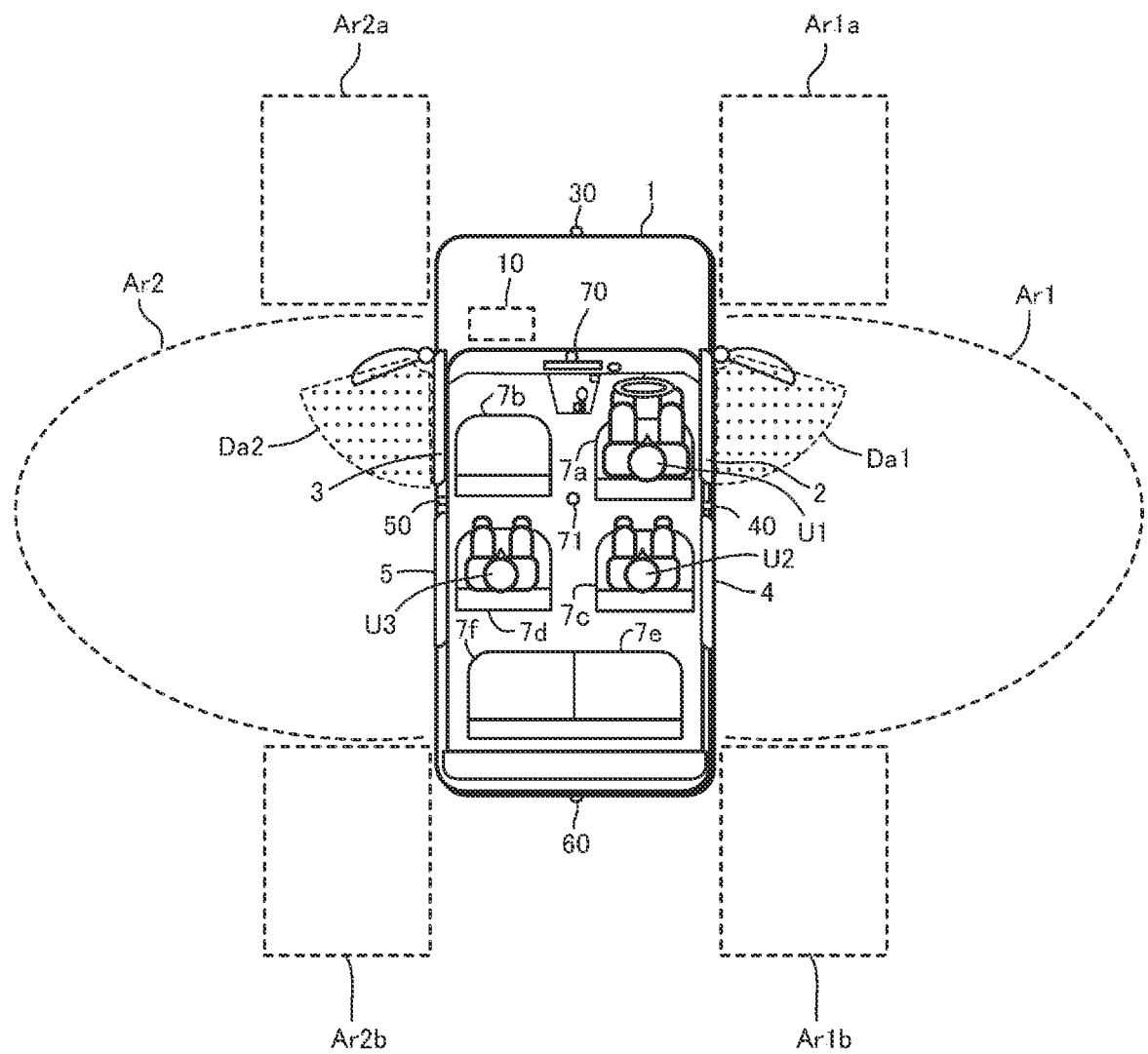
FIG. 3 is an explanatory diagram of a monitoring range by a right side camera and a left side camera.

A vehicle-surrounding-situation recognizing unit 17 recognizes a surroundings situation of the vehicle 1 based on the images taken by the front camera 30, the right side camera 40, the left side camera 50, and the rear camera 60. Here, FIG. 3 shows a photographing range Ar1 of the right side camera 40 and a photographing range Ar2 of the left side camera 50. The vehicle-surrounding-situation recognizing unit 17 recognizes obstacles, pedestrians, other vehicles, and the like existing in Ar1 and Ar2, from the images taken by the right side camera 40 and the left side camera 50. Da1 in FIG. 3 is a movable range of the right power hinge door 2, and Da2 in FIG. 3 is a movable range of the left power hinge door 3. Note that the vehicle-surrounding-situation recognizing unit 17 may use the images taken by the front camera 30 and the rear camera 60, or separately include a sonar sensor or the like, to extend the vehicle surrounding situation recognition range to a range including Ar1a, Ar1b, Ar2a, and Ar2b.

The door-getting-off-expected-number setting unit 18 specifies an expected-getting-off-door, which is a power door that the individual user in the vehicle 1 is expected to use for getting off, to set a door-getting-off-expected-number, which is the number of users who are expected to use each expected-getting-off-door when getting off. The door-getting-off-expected-number setting unit 18 specifies, for example, the expected-getting-off-door by any of the following first to third specifying conditions.

First specifying condition: The power door used when the user gets on the vehicle 1 is specified as the expected-getting-off-door, which the user is to use when getting off the vehicle 1.

Second specifying condition: When the getting-off-intention recognizing unit 16 recognizes the user's getting-off-intention for any of the power doors, the power door for which the getting-off-intention is recognized is specified as the expected-getting-off-door, which the user is to use when getting off the vehicle 1.

Third specifying condition: The power door closest to the seat that the user is on is specified as the expected-getting-off-door.

The off-vehicle-user-situation recognizing unit 19 recognizes a situation of the user who has got off the vehicle 1 based on the images taken by the right side camera 40 and the left side camera 50. The off-vehicle-user-situation recognizing unit 19 recognizes the face orientation and body orientation of the user who has got off the vehicle 1, distance between the vehicle 1 and the user, and the like. The power door control unit 20 controls the closing operation of the power door. The control by the power door control unit 20 is to be described below in detail.

3. Power Door Closing Operation Conditions

The conditions for the power door closing operation used by the power door control unit 20 are described with reference to FIGS. 4 to 10.

Figure 4:
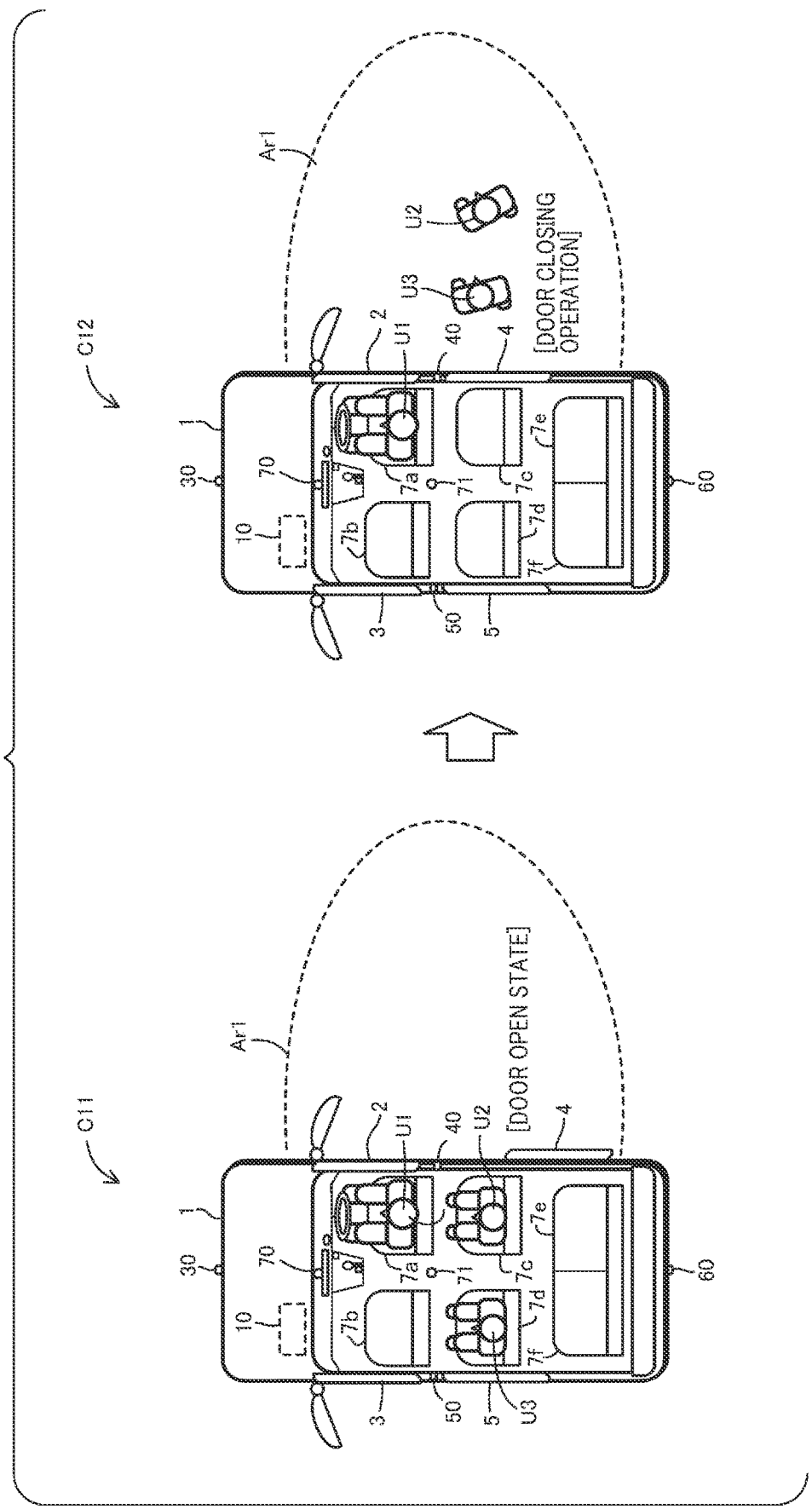
FIG. 4 is an explanatory diagram of control of closing operation of a right power slide door when users who have been on second row seats gets off the vehicle.
Figure 5:
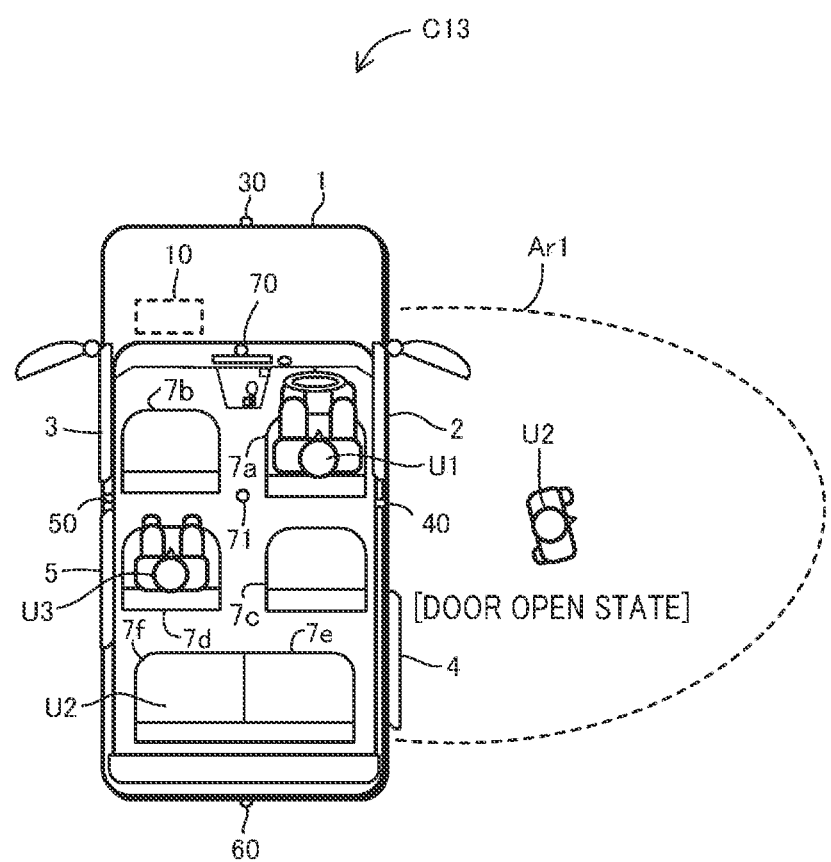
FIG. 5 is an explanatory diagram of the control of the closing operation of the right power slide door when only one of two users who have been on the second row seats gets off the vehicle.
Figure 6:
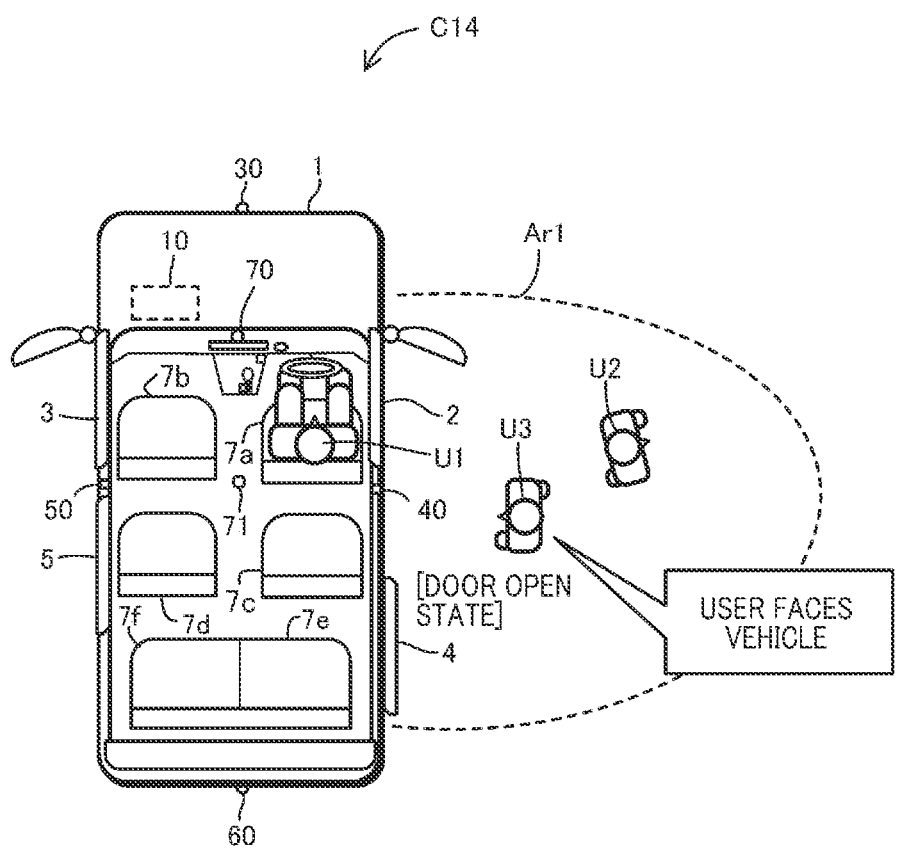
FIG. 6 is an explanatory diagram of the control of the closing operation of the right power slide door when a user who has got off from one of the second row seats faces the vehicle.

FIGS. 4 to 6 show a case in which the door-getting-off-expected-number setting unit 18 specifies the right power slide door 4 as the expected-getting-off-door, for users U2 and U3 who are on the second row seats. The door-getting-off-expected-number setting unit 18 sets the door-getting-off-expected-number to 2 for the right power slide door 4.

With reference to FIG. 4, C11 indicates a situation in which the vehicle 1 is parked, the user U1 is on the driver's seat 7a, the user U2 is on the second row right seat 7c, and the user U3 is on the second row left seat 7d. The vehicle 1 is recognized to be parked when the vehicle speed of the vehicle 1 detected by the speed sensor 110 is 0 km/hour and the position of the shift lever 73 detected by the shift switch 73a is P (Parking). C12 shows a situation in which the user U2 opens the right power slide door 4 and gets off the vehicle 1, and then the user U3 gets off from the right power slide door 4 in the open state.

In the situation of C12, the off-vehicle-user-number from the right power slide door 4 recognized by the off-vehicle-user-number recognizing unit 13 is 2, which equals the door-getting-off-expected-number of the right power slide door 4. Regarding any of the expected-getting-off-doors (here, the right power slide door 4), the power door control unit 20 thus causes the expected-getting-off-door, where the off-vehicle-user-number recognized by the off-vehicle-user-number recognizing unit 13 equals the door-getting-off-expected-number, to perform closing operation. Accordingly, in the situation C12, the power door control unit 20 causes the right power slide door 4 to perform closing operation.

Here, on condition that the off-vehicle-user-situation recognizing unit 19 recognizes that the users U3 and U4 who have got off are away from the vehicle 1 by a predetermined distance or more, and the users U3 and U4 turn their backs to the vehicle 1, the power door control unit 20 causes the right power slide door 4 to perform closing operation.

Next, C13 in FIG. 5 shows a situation in which, after the situation of C11 in FIG. 4 described above, the user U2 who has been on the second row right seat 7c gets off but the user U3 remains on the second row left seat 7d. In this case, for the right power slide door 4, the off-vehicle-user-number recognized by the off-vehicle-user-number recognizing unit 13 is 1, which is different from the door-getting-off-expected-number of 2. Therefore, the power door control unit 20 does not causes the right power slide door 4 to perform closing operation. As a result, the right power slide door 4 is kept open, and the user U3 can get off from the right power slide door 4 in the open state.

Next, FIG. 6 shows a situation in which the users U2 and U3 have got off from the vehicle 1 as in the case of C12 in FIG. 4 described above, but the user U3 faces the vehicle 1. In the situation, the off-vehicle-user-situation recognizing unit 19 recognizes that the user U3 faces the vehicle 1. Then, when the off-vehicle-user-situation recognizing unit 19 thus recognizes that the user U3 who has got off faces the vehicle 1, the power door control unit 20 prohibits the closing operation of the right power slide door 4.

This keeps the right power slide door 4 in the open state when the user U3 who has got off the vehicle 1 is coming back to take an object in the vehicle interior, or when the user U3 is talking with another user U1 in the vehicle interior, which improves the usability of the user U3.

Figure 7:
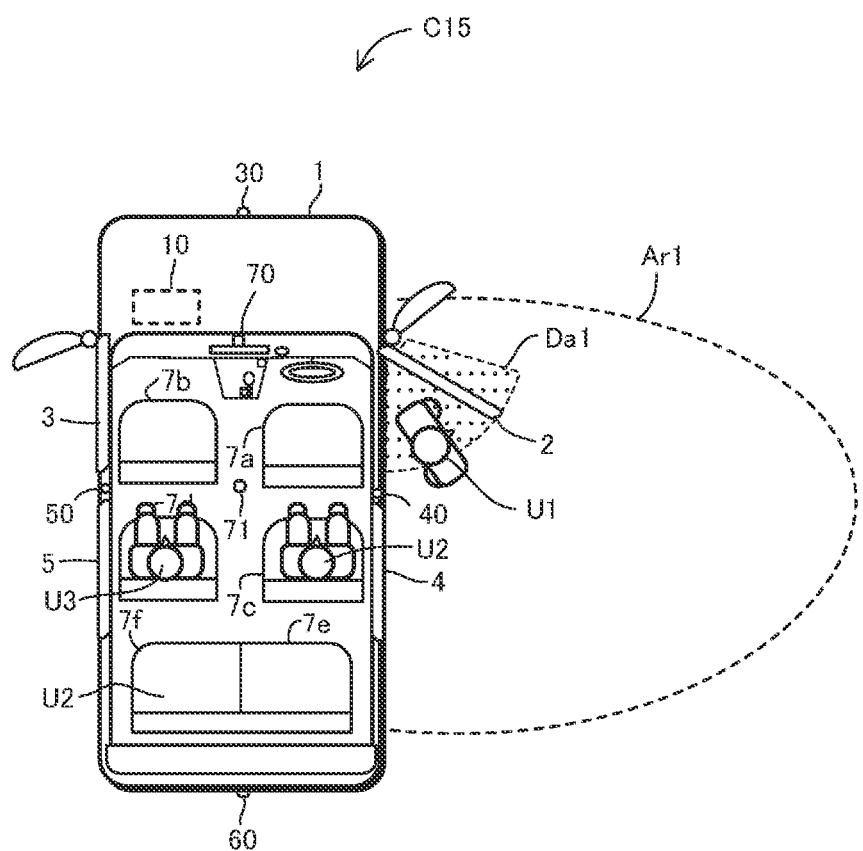
FIG. 7 is an explanatory diagram of the control of the closing operation of the right power hinge door when a user who has been in the driver's seat gets off the vehicle.

Next, C15 in FIG. 7 shows a situation in which the user U1 who has been on the driver's seat 7a opens the right power hinge door 2 and gets off. In this case, the off-vehicle-user-situation recognizing unit 19 recognizes that the user U1 is located within the movable range Da1 of the right power hinge door 2. Then, when the closing operation of right power hinge door 2 is performed in this situation, the right power hinge door 2 comes into contact with the user U1.

Therefore, the power door control unit 20 prohibits the closing operation of the right power hinge door 2 when it is recognized that the user U1 is located within the movable range Da1 of the right power hinge door 2. When the off-vehicle-user-situation recognizing unit 19 recognizes that the user U1 has moved to the outside of the movable range Da1 of the right power hinge door 2, the power door control unit 20 causes the right power hinge door 2 to perform closing operation.

Figure 8:
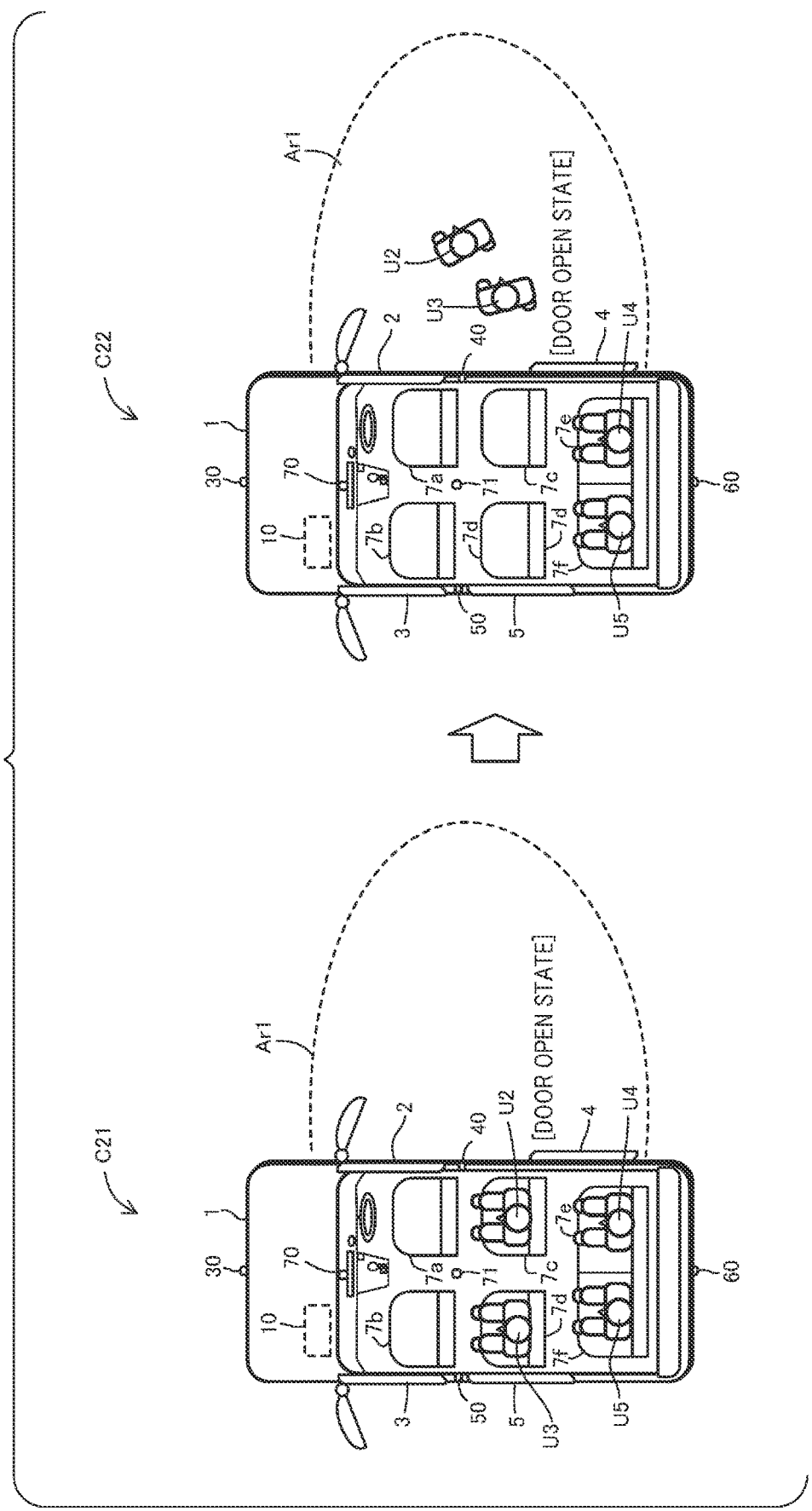
FIG. 8 is an explanatory diagram of control of the closing operation of the right power slide door when a user remains on a third row seat.
Figure 9:
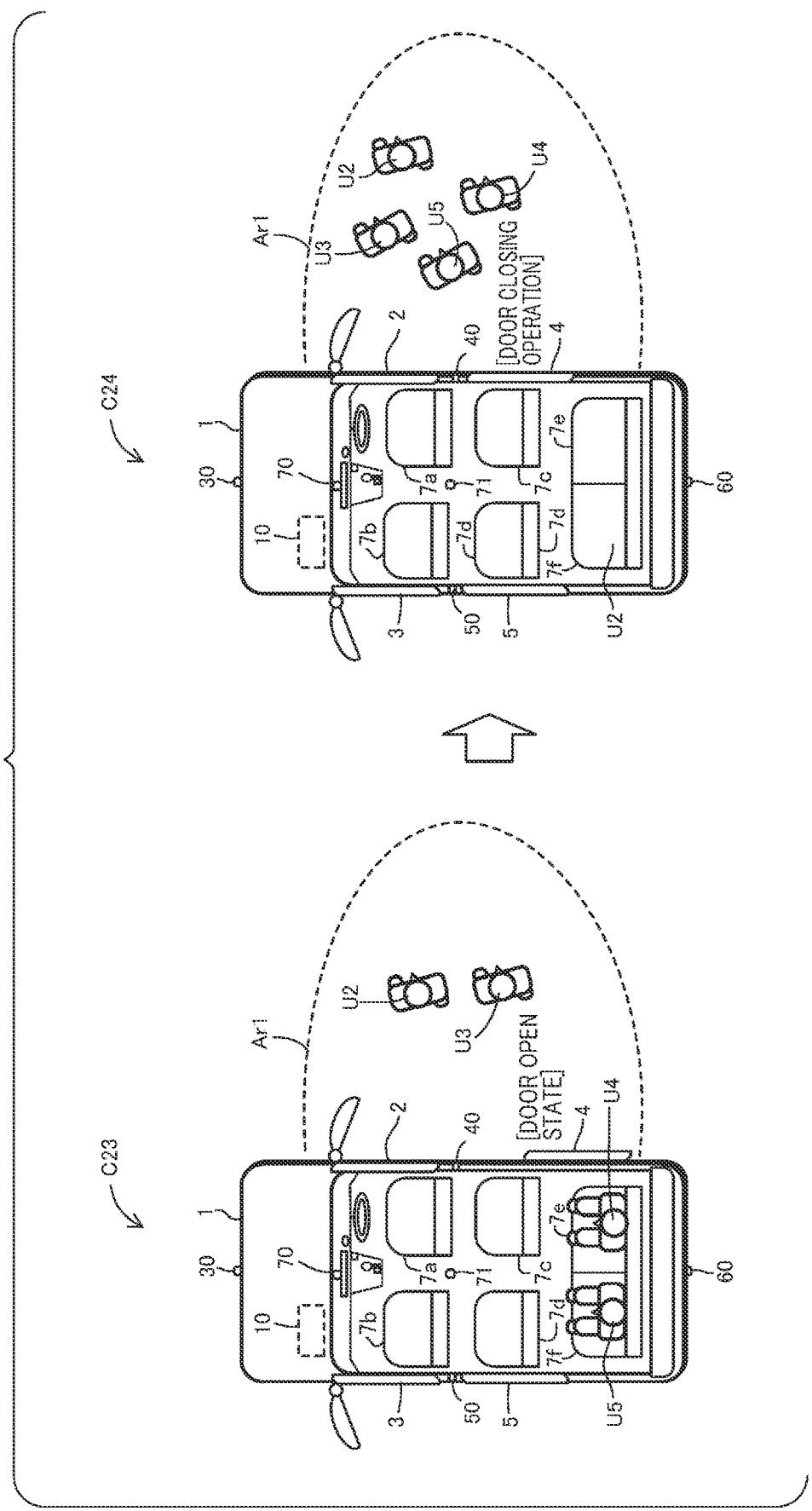
FIG. 9 is an explanatory diagram of the control of the closing operation of the right power slide door when all users who have been on the third row seats have got off the vehicle.

Next, FIGS. 8 to 9 show the case in which the door-getting-off-expected-number setting unit 18 specifies the right power slide door 4 as the expected-getting-off-door for users U2, U3 who are on the second row seats, and users U4, U5 who are on the third row seats. The door-getting-off-expected-number setting unit 18 sets the door-getting-off-expected-number to 4 for the right power slide door 4.

With reference to FIG. 8, C21 shows a situation in which the vehicle 1 is parked, the user U2 is on the second row right seat 7c, the user U3 is on the second row left seat 7d, the user U4 is on the third row right seat 7e, and the user U5 is on the third row left seat 7f. C22 shows a situation in which the user U2 opens the right power slide door 4 and gets off the vehicle 1, and then the user U3 gets off from the right power slide door 4 in the open state.

In the situation of C22, the off-vehicle-user-number recognized by the off-vehicle-user-number recognizing unit 13 for the right power slide door 4 is 2, which does not reach 4, which is the door-getting-off-expected-number. Therefore, the power door control unit 20 prohibits the closing operation of the right power slide door 4. As a result, the right power slide door 4 is kept in the open state.

Then, when the users U4 and U5 get off the vehicle 1 to make the situation of C24 after the state of C23 in FIG. 9, the off-vehicle-user-number for the right power slide door 4, which is recognized by the off-vehicle-user-number recognizing unit 13, becomes 4 to equal 4, which is the doorgetting-off-expected-number. Therefore, the power door control unit 20 causes the right power slide door 4 to perform closing operation.

Figure 10:
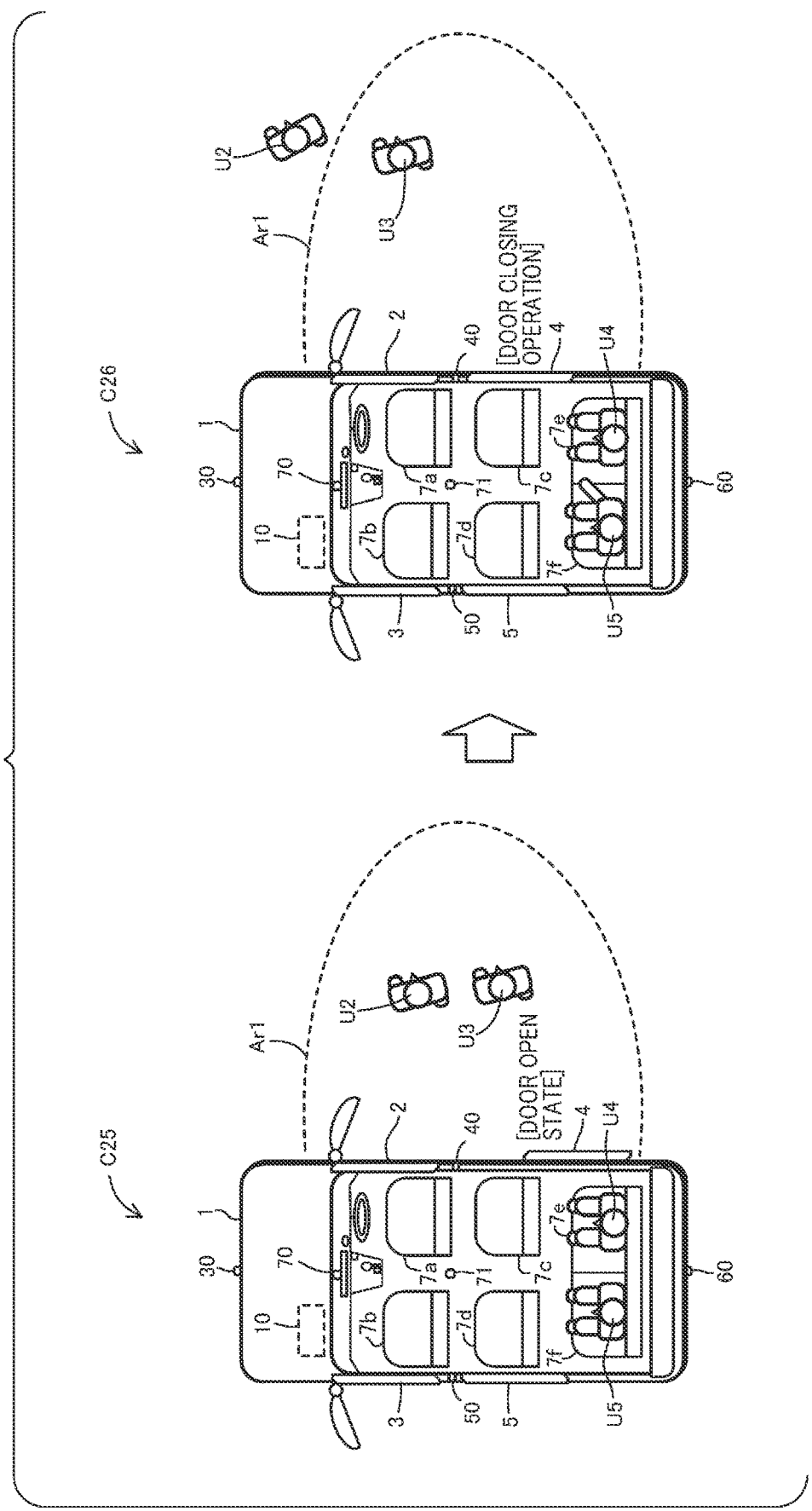
FIG. 10 is an explanatory diagram of the control for the closing operation of the right power slide door with users remaining on the third row seats.

C25 in FIG. 10 shows a situation in which: the user U2 who has been on the second row right seat 7c and the user U3 who has been on the second row left seat 7d get off the vehicle 1; but the user U4 who has got on the third row right seat 7e and the user U5 who has got on the third row left seat 7f stay in the interior of the vehicle 1. In this case, the power door control unit 20 causes the right power slide door 4 to perform closing operation when a predetermined time (for example, 5 seconds) elapses from the time when both the user U2 who has been on the second row right seat 7c and the user U3 who has been on the second row left seat 7d get off.

As a result, the right power slide door 4 is automatically closed when the user U4 and the user U5 do not get off the vehicle 1, so that the user U4 and the user U5 do not need to operate the right power slide door 4 to close it. In addition, the user U4 and the user U5 can cause the right power slide door 4 to perform closing operation by making a gesture of closing the right power slide door 4.

In other words, the power door control unit 20 causes the right power slide door 4 to perform closing operation when the gesture of closing the right power slide door 4 by the user U4 or the user U5 is recognized by the user-action recognizing unit 15. As a result, the user U4 and the user U5 can causes the right power slide door 4 to perform closing operation at any timing.

Note that, in FIGS. 4 to 10, situations are described in which the power door control unit 20 controls the closing operation of the right power hinge door 2 and the right power slide door 4, and the power door control unit 20 controls the closing operation of the left power hinge door 3 and the left power slide door 5 in the same manner.

In addition, in the situation of C21 in FIG. 8, when the vehicle-surrounding-situation recognizing unit 17 recognizes that there is an obstacle in the vicinity of the right power slide door 4, the display 31 or the speaker 32 may be used to notify the presence of the obstacle and recommendation to get off from the left power slide door 5. In this case, the door-getting-off-expected-number setting unit 18 specifies the left power slide door 5 as the expected-getting-off-door for users U2 to U5, and sets the door-getting-off-expected-number to 4 for the left power slide door 5.

4. Control of Power Door Closing Operation

Figure 11:
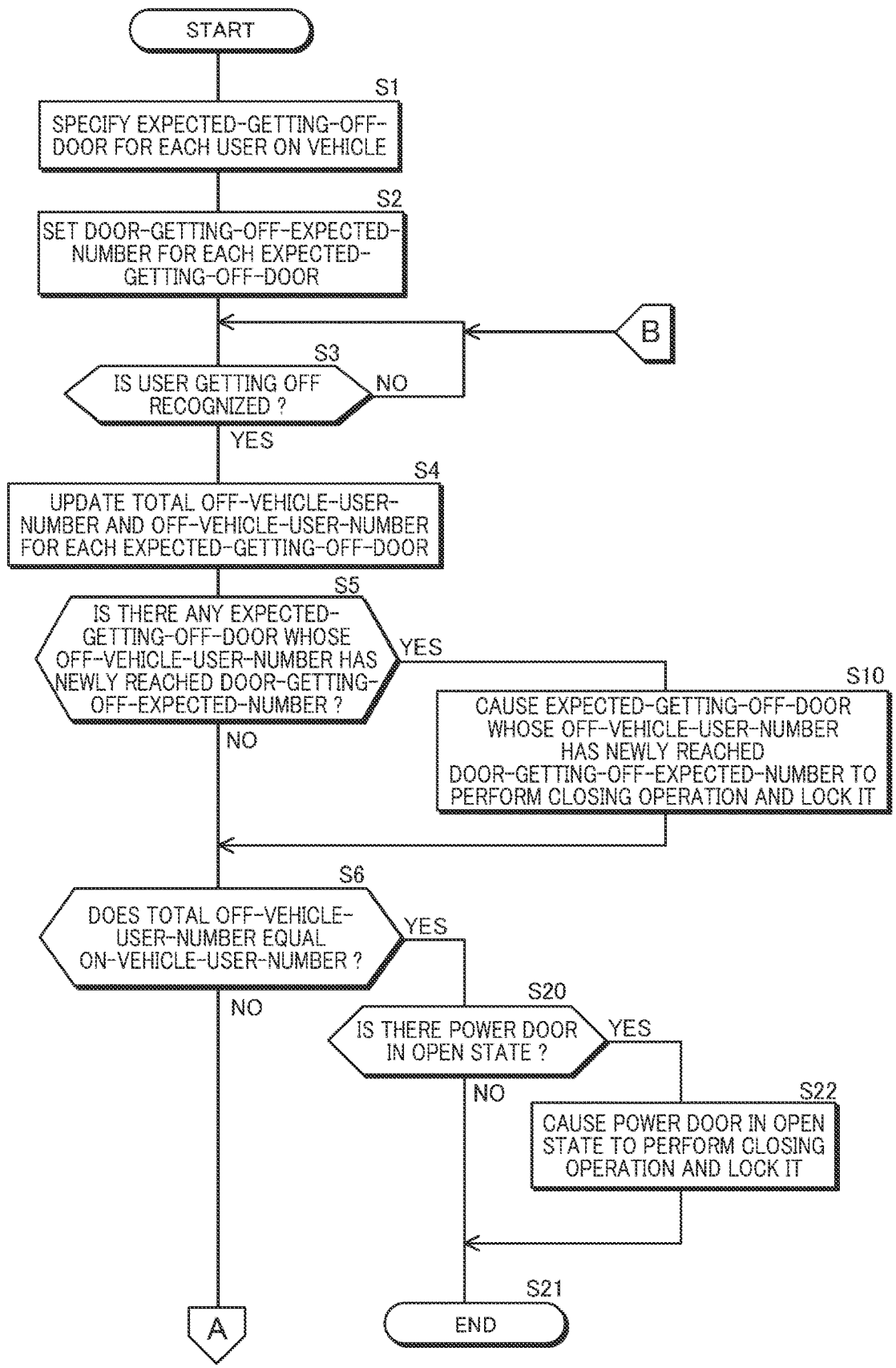
FIG. 11 is a first flowchart of the control of the closing operation of a power door.

Control of closing operation of each power door is described below with reference to flowcharts shown in FIGS. 11 to 12. Steps S1 to S2 of FIG. 11 are processes by the door-getting-off-expected-number setting unit 18. In step S1, the door-getting-off-expected-number setting unit 18 specifies the expected-getting-off-door for each user who is in the vehicle 1 by any of the first to third specifying conditions.

In following step S2, the door-getting-off-expected-number setting unit 18 sets the door-getting-off-expected-number for each expected-getting-off-door, which is specified in step S1. For example, in the case of FIG. 3, the door-getting-off-expected-number setting unit 18 specifies the right power hinge door 2 and the right power slide door 4 as the expected-getting-off-doors. Then, the door-getting-off-expected-number setting unit 18 sets the door-getting-off-expected-number to 1 for the right power hinge door 2, and sets the door-getting-off-expected-number to 2 for the right power slide door 4.

Next steps S3 to S4 are processes by the off-vehicle-user-number recognizing unit 13. When the off-vehicle-user-number recognizing unit 13 recognizes the user who has got off the vehicle 1 in step S3, it advances the process to step S4. In step S4, the off-vehicle-user-number recognizing unit 13 updates the off-vehicle-user-number of each expected-getting-off-door, and also updates the total number of users who has got off the vehicle 1 (total off-vehicle-user-number).

Following step S5 and the subsequent steps thereof are processes by the power door control unit 20. In step S5, the power door control unit 20 determines whether there is an expected-getting-off-door whose off-vehicle-user-number has newly reached door-getting-off-expected-number. Then, when there is an expected-getting-off-door whose off-vehicle-user-number has newly reached the door-getting-off-expected-number, the power door control unit 20 advances the process to step S10 for causing the expected-getting-off-door whose off-vehicle-user-number has newly reached the door-getting-off-expected-number to perform closing operation and for locking it, and advances the process to step S6.

On the other hand, when there is no expected-getting-off-door whose off-vehicle-user-number has reached the door-getting-off-expected-number, the power door control unit 20 advances the process to step S6. In step S6, the power door control unit 20 determines whether the total off-vehicle-user-number equals the on-vehicle-user-number. Then, the power door control unit 20 advances the process to step S20 when the total off-vehicle-user-number equals the on-vehicle-user-number, and advances the process to step S7 of FIG. 12 when the total off-vehicle-user-number is different from the on-vehicle-user-number.

In step S20, the power door control unit 20 determines whether there is a power door in the open state. Then, when there is a power door in the open state, the power door control unit 20 advances the process to step S22 for causing the power door in the open state to perform closing operation and for locking it, and advances the process to step S21 to end the control of closing operation of the power door. On the other hand, when there is no power door in the open state, the power door control unit 20 advances the process to step S21 to end the control of the closing operation of the power door.

Here, in the processes of steps S5 and S10, the power door control unit 20 normally causes the last remaining expected-getting-off-door to perform the closing operation when the total off-vehicle-user-number equals the on-vehicle-user-number. Therefore, when all the expected-getting-off-doors have performed the closing operation, the process is advanced from step S6 to step S20 and step S21, and no power door performs the closing operation in step S22.

However, if a user gets off from a door other than the expected-getting-off-door, there is still an expected-getting-off-door remaining in the open state when the total off-vehicle-user-number equals the on-vehicle-user-number in step S6. Then, in this case, the process of step S22 can cause doors to perform the closing operation, in which the doors are the expected-getting-off-door in the open state, and the power door, other than the expected-getting-off-door, that a user has opened when getting off the vehicle.

Figure 12:
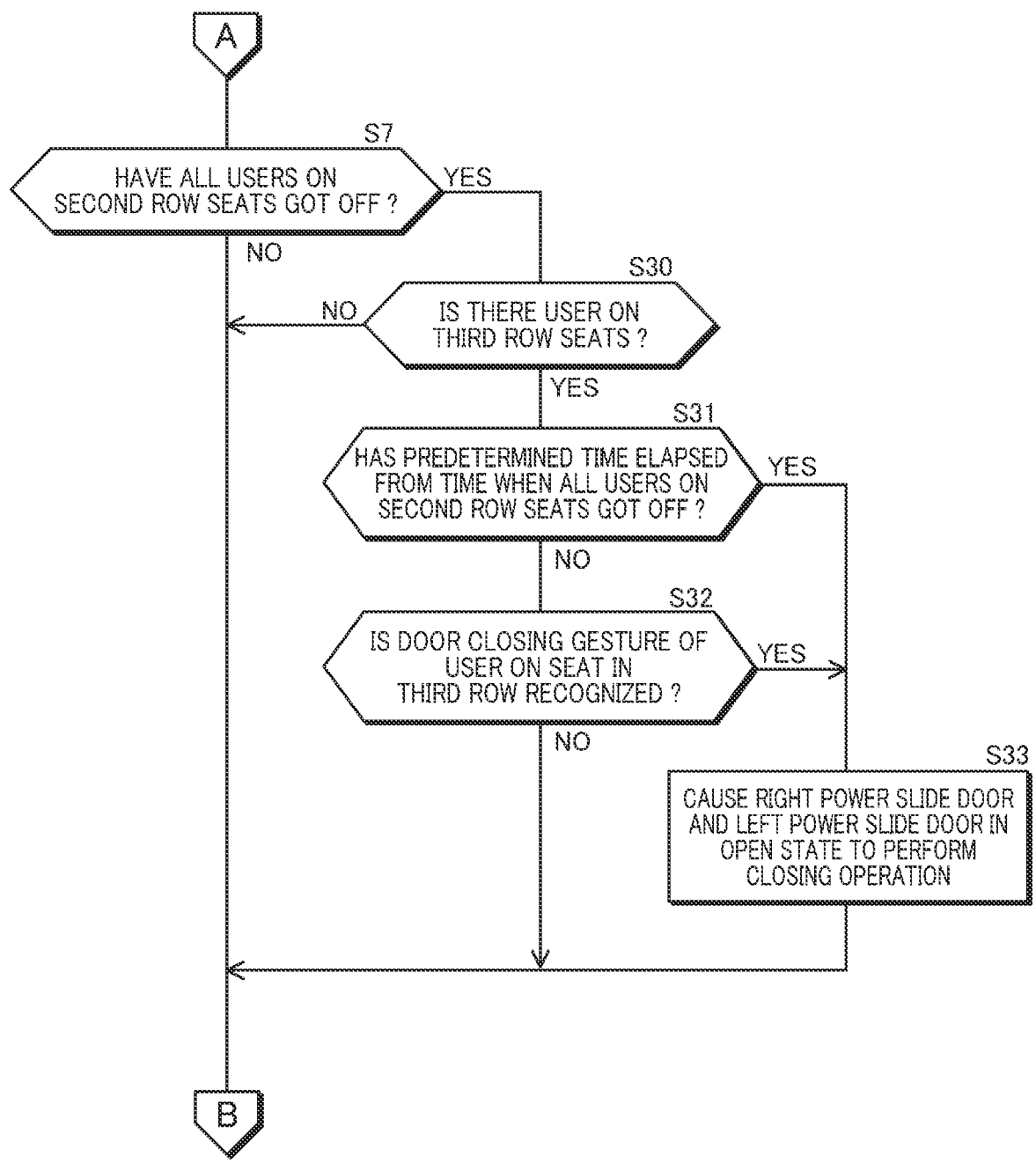
FIG. 12 is a second flowchart of the control of the closing operation of the power door.

Step S7, steps S30 to S32, and step S33 of FIG. 12 are processes corresponding to the situations described with reference to FIGS. 8 to 10. In step S7, the power door control unit 20 determines whether all the users U2 and U3 who were on the second row seats (second row right seat 7c, second row left seat 7d) has got off the vehicle 1. The fact that the users U2 and U3 have got off the vehicle 1 is recognized by the user-action recognizing unit 15.

The power door control unit 20 advances the process to step S30 when the users U2 and U3 has got off the vehicle 1, and advances the process to step S3 of FIG. 11 when either or both of users U2 and U3 have not got off the vehicle 1 yet.

In step S30, the power door control unit 20 determines whether there are any of users U4 and U5 on the third row seats (third row right seat 7e, third row left seat 7f). The power door control unit 20 recognizes the existence or absence of users U4 and U5 who are on the third row seats from the image taken by the rear-seat camera 71. The power door control unit 20 advances the process to step S31 when there are users U4 and U5 who are on the third row seats, and advances the process to step S3 of FIG. 11 when there are no users U4 or U5 on the third row seats.

In step S31, the power door control unit 20 determines whether a predetermined time (for example, 5 seconds) has elapsed from the time when all the users U2 and U3 who were in the second row seats got off the vehicle 1. Then, the power door control unit 20 advances the process to step S33 when the predetermined time has elapsed, and advances the process to step S3 of FIG. 11 when the predetermined time has not elapsed.

In step S33, the power door control unit 20 causes the right power slide door 4 or the left power slide door 5 (the right power slide door 4 in the examples of FIGS. 8 to 10), which is in the open state, to perform the closing operation, and advances the process to step S3 of FIG. 11. Here, when the getting-off-intention recognizing unit 16 recognizes the getting-off-intention of the user U4 or U5 who is in the third row seat, the power door control unit 20 may work so as not to cause the right power slide door 4 or the left power slide door 5, which is in the open state, to perform closing operation if the predetermined time has elapsed in step S31.

In step S32, the power door control unit 20 determines whether the user-action recognizing unit 15 recognizes the door closing gesture by the user U4 or U5 on the third row seats. Then, the power door control unit 20 advances the process to step S33 when the door closing gesture is recognized, and advances the process to step S3 of FIG. 11 when the door closing gesture is not recognized.

Here, when the power door control unit 20 causes the power door to perform the closing operation in step S10 and step S22 of FIG. 11, and step S33 of FIG. 12, as described above with reference to C12 of FIG. 4 and C14 of FIG. 6, the power door control unit 20 determines whether the users who have got off are away from the vehicle 1 by a predetermined distance or more and turn their backs to the vehicle 1, and whether they face the vehicle 1, to determine whether to cause the power door to perform closing operation.

5. Other Embodiments

In the above embodiment, the door-getting-off-expected-number setting unit 18 is provided, and the power door control unit 20 sequentially caused the power doors individually to perform closing operation by the processes of steps S5 and S10 of FIG. 11. Another embodiment may be configured such that the door-getting-off-expected-number setting unit 18 is not provided and the processes of step S5 and step S10 are omitted. In this case, when the total off-vehicle-user-number is the same as the on-vehicle-user-number in step S6, all the power doors used for getting off the vehicle 1 perform closing operation in step S22.

In the above embodiment, as shown in C12 of FIG. 4, the power door control unit 20 determines that the users U2 and U3 who have got off turns their backs to the vehicle 1 to cause the right power slide door 4 to perform closing operation, but this determination may be omitted.

In the above embodiment, as shown in C14 of FIG. 6, the power door control unit 20 determines that the user U3 who has got off faces the vehicle 1 to prohibit the closing operation of the right power slide door 4, but this determination may be omitted.

In the above embodiment, as shown in FIG. 10, when the users U4 and U5 are on the third row seats 7e and 7f and a predetermined time has elapsed from the time when the users U2 and U3 on the second row seats get off, the power door control unit 20 performs the process to cause the right power slide door 4 to perform closing operation. Another embodiment may be configured such that this process is not performed.

In the above embodiment, as shown in FIG. 10, when users U4 and U5 are on the third row seats 7e and 7f and users U2 and U3 on the second row seats have got off, the power door control unit 20 performs the process of causing the right power slide door 4 to perform closing operation in response to the door closing gesture by user U4 or user U5. Another embodiment may be configured such that this process is not performed.

In the above embodiment, in step S10 and step S22 of FIG. 11, and step S33 of FIG. 12, the power door control unit 20 locks the power door after causing the power door to perform closing operation, but a configuration may be such that the power door lock is not performed.

In the above embodiment, the vehicle 1 having a seating capacity of 6 is shown, but the present invention can be applied to any vehicle provided with a power door regardless of the seating capacity. In a case in which seats in the fourth and subsequent rows are provided and rear-seat power doors common to the second row seats are provided for the seats in the third row and the subsequent rows, when at least one user is on the seats in the third row or the subsequent rows, the control for closing operation of the rear-seat power door (right power slide door in the examples of FIGS. 8 to 10) may be performed as described above with reference to FIGS. 8 to 10.

Figure 2:
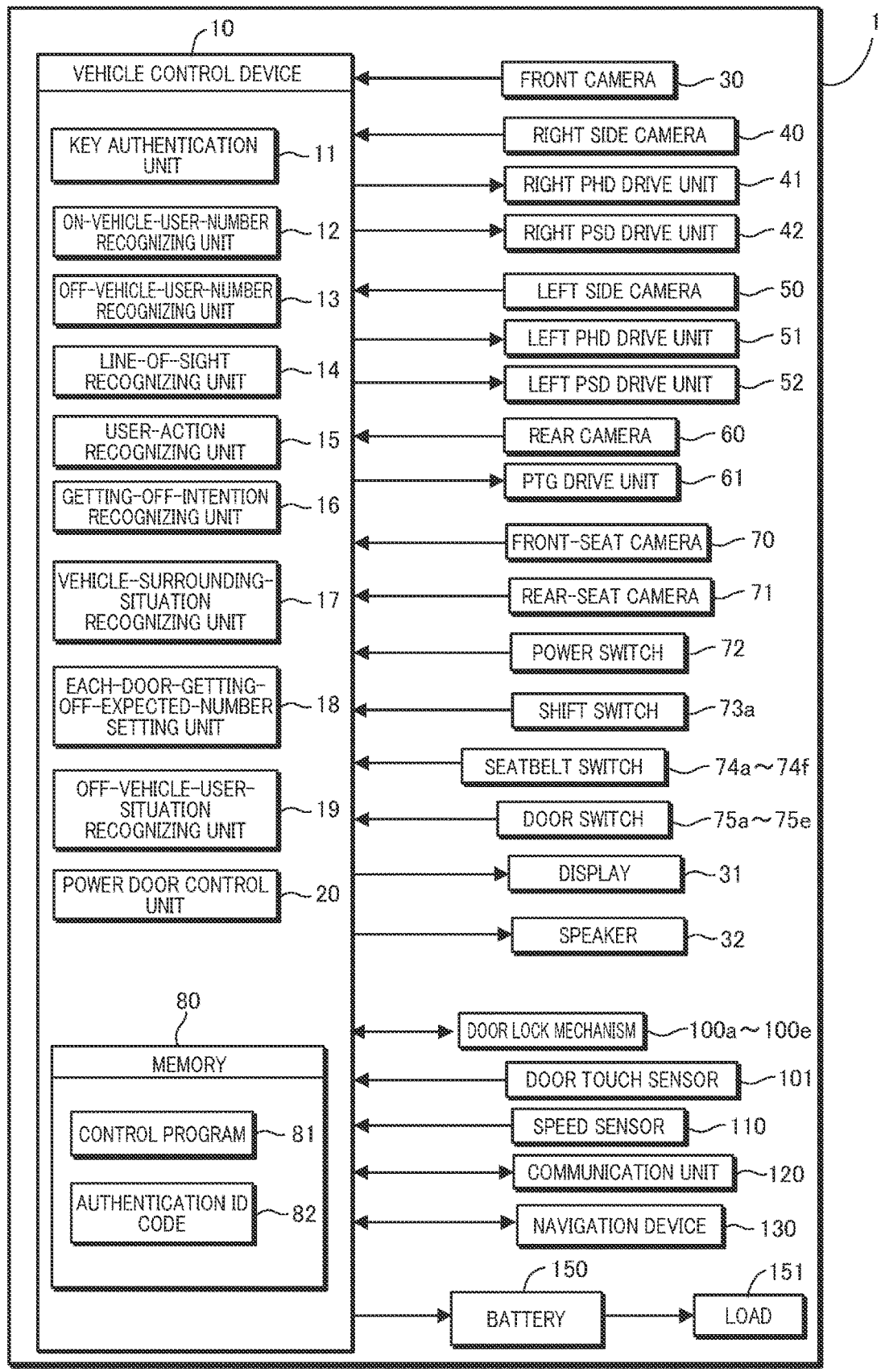
FIG. 2 is a configuration diagram of a vehicle control device.

Note that, FIGS. 1 and 2 are schematic diagrams showing the configurations of the vehicle 1 and the vehicle control device 10 classified according to what is mainly in the process in order to facilitate understanding of the invention of the application, and the configurations of the vehicle 1 and the vehicle control device 10 may be configured by other classification. In addition, the process of each component may be executed by one hardware unit, or may be executed by a plurality of hardware units. Furthermore, the process by each component shown in FIGS. 11 to 12 may be executed by one program or may be executed by a plurality of programs.

6. Configurations Supported by the Above Embodiments

The above embodiments are specific examples of the following configurations.

Item 1

A vehicle control device that controls closing operation of a power door provided in a vehicle, the device including: an on-vehicle-user-number recognizing unit that performs recognition of an on-vehicle-user-number, and stores the on-vehicle-user-number in a storage unit, the on-vehicle-user-number being a number of users who have got on the vehicle; an off-vehicle-user-number recognizing unit that recognizes an off-vehicle-user-number, the off-vehicle-user-number being a number of the users who have got off the vehicle after the recognition of the on-vehicle-user-number by the on-vehicle-user-number recognizing unit; and a power door control unit that causes at least one power door to perform closing operation when the on-vehicle-user-number stored in the storage unit equals the off-vehicle-user-number recognized by the off-vehicle-user-number recognizing unit, the at least one power door being a power door that the user has used at a time of getting off the vehicle.

According to the vehicle control device of item 1, when the on-vehicle-user-number recognized by the on-vehicle-user-number recognizing unit and stored in the storage unit equals the off-vehicle-user-number recognized by the off-vehicle-user-number recognizing unit, the power door control unit causes the at least one power door, which the user has used at a time of getting off, to perform closing operation. As a result, when all the users who are on the vehicle get off, the operation for closing the power door is reduced, so that the load on the user at a time of getting off the vehicle can be reduced.

Item 2

The vehicle control device according to item 1, the vehicle having a plurality of the power doors, the vehicle control device including a door-getting-off-expected-number setting unit that specifies an expected-getting-off-door for each user who is on the vehicle so that the door-getting-off-expected-number setting unit sets a door-getting-off-expected-number for each expected-getting-off-door, the expected-getting-off-door being one of the power doors that the individual user is expected to use when getting off the vehicle, the door-getting-off-expected-number being a number of the users who are expected to use the individual expected-getting-off-door, wherein: the off-vehicle-user-number recognizing unit recognizes a number of the users who have got off the vehicle, separately for the individual power door used when the individual users get off the vehicle; and for the individual expected-getting-off-door, the power door control unit performs an individual power door closing operation process when a number of the users who have got off the vehicle from the expected-getting-off-door equals the door-getting-off-expected-number, the individual power door closing operation process causing the individual expected-getting-off-door to perform closing operation, the number of the users who have got off the vehicle from the expected-getting-off-door being recognized by the off-vehicle-user-number recognizing unit.

According to the vehicle control device of item 2, it is possible to sequentially cause each of the expected-getting-off-doors, which is used when the users get off in the open state, to perform closing operation at the timing when the door-getting-off-expected-number of users get off from the expected-getting-off-door.

Item 3

The vehicle control device according to item 2, including an off-vehicle-user-situation recognizing unit that recognizes a situation of the user who has got off the vehicle, wherein the power door control unit causes the expected-getting-off-door to perform closing operation in the individual power door closing operation process, when a number of the users who have got off the vehicle from the expected-getting-off-door, which is recognized by the off-vehicle-user-number recognizing unit, equals the door-getting-off-expected-number, and when the off-vehicle-user-situation recognizing unit recognizes that the user who has got off the vehicle from the expected-getting-off-door turns his/her back to the vehicle away from the vehicle by a predetermined distance or more.

According to the vehicle control device of item 3, it is possible to cause the expected-getting-off-door to perform closing operation at the timing when the user who has got off the vehicle turns his/her back to the vehicle away from the vehicle, which can be recognized that the user has finished using the vehicle.

Item 4

The vehicle control device according to item 2, including an off-vehicle-user-situation recognizing unit that recognizes a situation of the user who has got off the vehicle, wherein the power door control unit prohibits closing operation of the expected-getting-off-door in the individual power door closing operation process, when a number of the users who have got off the vehicle from the expected-getting-off-door, which is recognized by the off-vehicle-user-number recognizing unit, equals the door-getting-off-expected-number, and when the off-vehicle-user-situation recognizing unit recognizes that the user who has got off the vehicle from the expected-getting-off-door faces the vehicle.

According to the vehicle control device of item 4, when the user who has got off the vehicle faces the vehicle, it is expected that the situation is such that the expected-getting-off-door needs to be open, such as waiting for another user in the vehicle to get off, and talking to another user in the vehicle. Then, in this case, the closing operation of the expected-getting-off-door is prohibited so that the expected-getting-off-door can be prevented from being closed against the intention of the user who has got off.

Item 5

The vehicle control device according to any one of items 1 to 4, the vehicle having seats in a third and subsequent rows, the vehicle including a rear-seat power door, the rear-seat power door being the power door corresponding to the seats in the third and subsequent rows, and the second row, the vehicle control device including a user-action recognizing unit that recognizes an action of the user who is on the vehicle, wherein the power door control unit causes the rear-seat power door to perform closing operation when the user-action recognizing unit recognizes that none of the users who are on the seats in the third and subsequent rows get off the vehicle from the time when the user-action recognizing unit recognizes that all the users who have been on the seats in the second row get off the vehicle to the time when a predetermined time elapses.

According to the vehicle control device of item 5, when the users on the seat in the third and subsequent rows are expected to have no intention of getting off due to elapse of the predetermined time, it is possible to cause the rear-seat power door to perform closing operation.

Item 6

The vehicle control device according to item 5, including a getting-off-intention recognizing unit that recognizes getting-off-intention of the user who is on the vehicle, wherein the power door control unit does not cause the rear-seat power door to perform closing operation while the getting-off-intention recognizing unit recognizes getting-off-intention of the user who is on the seats in the third and subsequent rows, even when the predetermined time elapses.

According to the vehicle control device of item 6, it is possible to prevent the rear-seat power door from closing against the intention of the user who is getting off from the seats in the third and subsequent rows.

Item 7

The vehicle control device according to any one of items 1 to 4, the vehicle having seats in a third and subsequent rows, the vehicle including a rear-seat power door, the rear-seat power door being the power door corresponding to the seats in the third and subsequent rows, and the second row, the vehicle control device including a user-action recognizing unit that recognizes an action of the user who is on the vehicle, wherein the power door control unit causes the rear-seat power door to perform closing operation, when the user-action recognizing unit recognizes that all the users on the seats in the second row have got off the vehicle, and then the user-action recognizing unit recognizes that any of the users on the seats in the third and subsequent rows makes a gesture instructing closing operation of the rear-seat power door.

According to the vehicle control device of item 7, the user who is on the seats in the third and subsequent rows can cause the rear-seat power door to perform closing operation by making a gesture when the user does not intend to get off.

Item 8

The vehicle control device according to any one of items 1 to 7, wherein the power door control unit locks the power door that the power door control unit has caused to perform closing operation.

According to the vehicle control device of item 8, it is possible to eliminate the need for the user to operate for locking the power door to further reduce the load on the user when the user gets off the vehicle.

Item 9

A vehicle control method that is executed by a computer to control closing operation of a power door provided in a vehicle, the method including: an on-vehicle-user-number recognizing step that performs recognition of an on-vehicle-user-number, and stores the on-vehicle-user-number in a storage unit, the on-vehicle-user-number being a number of users who have got on the vehicle; an off-vehicle-user-number recognizing step that recognizes an off-vehicle-user-number, the off-vehicle-user-number being a number of the users who have got off the vehicle after the recognition of the on-vehicle-user-number by the on-vehicle-user-number recognizing step; and a power door control step that causes at least one power door to perform closing operation when the on-vehicle-user-number stored in the storage unit equals the off-vehicle-user-number recognized by the off-vehicle-user-number recognizing step, the at least one power door being a power door that the users have used at a time of getting off the vehicle.

Causing a computer to execute the vehicle control method of item 9 enables obtaining the same function effect as the vehicle control device of item 1.

Item 10

A non-transient recording medium on which a vehicle control program for controlling closing operation of a power door provided in a vehicle is recorded, the program causing a computer to function as: an on-vehicle-user-number recognizing unit that performs recognition of an on-vehicle-user-number, and stores the on-vehicle-user-number in a storage unit, the on-vehicle-user-number being a number of users who have got on the vehicle; an off-vehicle-user-number recognizing unit that recognizes an off-vehicle-user-number, the off-vehicle-user-number being a number of the users who have got off the vehicle after the recognition of the on-vehicle-user-number by the on-vehicle-user-number recognizing unit; and a power door control unit that causes at least one power door to perform closing operation when the on-vehicle-user-number stored in the storage unit equals the off-vehicle-user-number recognized by the off-vehicle-user-number recognizing unit, the at least one power door being a power door that the user has used at a time of getting off the vehicle.

Causing a computer to execute the vehicle control program of item 10 enables realizing the configuration of the vehicle control device of item 1.

REFERENCE SIGNS LIST 1 vehicle
2 right power hinge door
3 left power hinge door
4 right power slide door
5 left power slide door
6 power tailgate
10 vehicle control device
11 key authentication unit
12 on-vehicle-user-number recognizing unit
13 off-vehicle-user-number recognizing unit
14 line-of-sight recognizing unit
15 user-action recognizing unit
16 getting-off-intention recognizing unit
17 vehicle-surrounding-situation recognizing unit
18 door-getting-off-expected-number setting unit
19 off-vehicle-user-situation recognizing unit
20 power door control unit
80 memory
81 control program

What is claimed is:

1. A vehicle control device that controls a closing operation of a plurality of power doors provided in a vehicle, the vehicle control device comprising an ECU (Electronic Control Unit) including:

an on-vehicle-user-number recognizing unit that performs recognition of an on-vehicle-user-number, and stores the on-vehicle-user-number in a memory, the on-vehicle-user-number being a number of users who have got on the vehicle;

an off-vehicle-user-number recognizing unit that recognizes an off-vehicle-user-number, the off-vehicle-user-number being a number of the users who have got off the vehicle after the recognition of the on-vehicle-user-number by the on-vehicle-user-number recognizing unit;

a power door control unit that causes at least one power door, of the plurality of power doors, to perform the closing operation when the on-vehicle-user-number stored in the memory equals the off-vehicle-user-number recognized by the off-vehicle-user-number recognizing unit, the at least one power door being a power door that the users have used at a time of getting off the vehicle; and a door-getting-off-expected-number setting unit that specifies an expected-getting-off-door for each of the users who are on the vehicle so that the door-getting-off-expected-number setting unit sets a door-getting-off-expected-number for each of the expected-getting-off-door, the expected-getting-off-door being one of the plurality of power doors that a user, of the users, is expected to use when getting off the vehicle, the door-getting-off-expected-number being a number of the users who are expected to use the expected-getting-off-door, wherein the off-vehicle-user-number recognizing unit recognizes a number of the users who have got off the vehicle, separately, for each of the plurality of power doors used when the users get off the vehicle, for each of the expected-getting-off-door, the power door control unit performs an individual power door closing operation process when the number of the users who have got off the vehicle from the expected-getting-off-door equals the door-getting-off-expected-number, the individual power door closing operation process causing each of the expected-getting-off-door whose number of the users who have got off the vehicle equals the door-getting-off-expected-number to perform the closing operation, and the individual power door closing operation process does not occur for each of the expected-getting-off-door whose number of the users who have got off the vehicle is different from the door-getting-off-expected-number, the number of the users who have got off the vehicle being recognized by the off-vehicle-user-number recognizing unit.

2. The vehicle control device according to claim 1, wherein the ECU includes an off-vehicle-user-situation recognizing unit that recognizes a situation of a user who has got off the vehicle, and the power door control unit causes the expected-getting-off-door to perform the closing operation in the individual power door closing operation process, when the number of the users who have got off the vehicle from the expected-getting-off-door, which is recognized by the off-vehicle-user-number recognizing unit, equals the door-getting-off-expected-number, and when the off-vehicle-user-situation recognizing unit recognizes that the user who has got off the vehicle from the expected-getting-off-door turns their back to the vehicle away from the vehicle by a predetermined distance or more.

3. The vehicle control device according to claim 1, wherein the ECU includes an off-vehicle-user-situation recognizing unit that recognizes a situation of a user who has got off the vehicle, and the power door control unit prohibits the closing operation of the expected-getting-off-door in the individual power door closing operation process, when the number of the users who have got off the vehicle from the expected-getting-off-door, which is recognized by the off-vehicle-user-number recognizing unit, equals the door-getting-off-expected-number, and when the off-vehicle-user-situation recognizing unit recognizes that the user who has got off the vehicle from the expected-getting-off-door faces the vehicle.

4. The vehicle control device according to claim 1, wherein the vehicle includes seats in a third and subsequent rows, the vehicle including a rear-seat power door, the rear-seat power door being the power door corresponding to the seats in the third and subsequent rows, and a second row, wherein the ECU includes a user-action recognizing unit that recognizes an action of a user who is on the vehicle, and the power door control unit causes the rear-seat power door to perform the closing operation when the user-action recognizing unit recognizes that none of the users who are on the seats in the third and subsequent rows get off the vehicle from a time when the user-action recognizing unit recognizes that all the users who have been on the seats in the second row get off the vehicle to a time when a predetermined time elapses.

5. The vehicle control device according to claim 4, wherein the ECU includes:

a getting-off-intention recognizing unit that recognizes getting-off-intention of the user who is on the vehicle; and a line-of-sight recognizing unit that recognizes a line-of-sight direction of the user who is on the vehicle from a user's face image, of the user who is on the vehicle, taken by a camera, wherein the getting-off-intention recognizing unit recognizes the getting-off-intention of the user who is on the vehicle when the line-of-sight recognizing unit recognizes that the line of sight of the user who is on the vehicle is directed to one of the plurality power doors, and when the user-action recognizing unit recognizes the action of approaching the power door to which the user who is on the vehicle directs the line-of-sight, and the power door control unit does not cause the rear-seat power door to perform the closing operation while the getting-off-intention recognizing unit recognizes the getting-off-intention of a user who is on at least one of the seats in one of the third and subsequent rows, even when the predetermined time elapses.

6. The vehicle control device according to claim 1, wherein the vehicle includes seats in a third and subsequent rows, the vehicle including a rear-seat power door, the rear-seat power door being the power door corresponding to the seats in the third and subsequent rows, and a second row, wherein the ECU includes a user-action recognizing unit that recognizes an action of a user who is on the vehicle, and the power door control unit causes the rear-seat power door to perform the closing operation, when the user-action recognizing unit recognizes that all the users on the seats in the second row have got off the vehicle, and then the user-action recognizing unit recognizes that any of the users on the seats in the third and subsequent rows makes a gesture instructing the closing operation of the rear-seat power door.

7. The vehicle control device according to claim 1, wherein the power door control unit locks the power door that the power door control unit has caused to perform the closing operation.

8. The vehicle control device according to claim 1, wherein the ECU includes:

a getting-off-intention recognizing unit that recognizes a getting-off-intention of a user who is on the vehicle; and a line-of-sight recognizing unit that recognizes a line-of-sight direction of the user who is on the vehicle from a user's face image, of the user, taken by a camera, wherein the getting-off-intention recognizing unit recognizes the getting-off-intention of the user who is on the vehicle when the line-of-sight recognizing unit recognizes that the user's line of sight is directed to one of the plurality of power doors, and when the user-action recognizing unit recognizes the action of approaching the power door to which the user who is on the vehicle directs the line-of-sight, and the door-getting-off-expected-number setting unit specifies the expected-getting-off-door by any of the following first to third specifying conditions:

the first specifying condition being that the power door used when a user gets on the vehicle is specified as the expected-getting-off-door;

the second specifying condition being that when the getting-off-intention recognizing unit recognizes the getting-off-intention of the user who is on the vehicle for any of the plurality of power doors, the power door for which the getting-off-intention is recognized is specified as the expected-getting-off-door; and the third specifying condition being that the power door closest to a seat that the user who is on the vehicle is on is specified as the expected-getting-off-door.

9. A vehicle control method that is executed by a computer to control a closing operation of a plurality of power doors provided in a vehicle, the method comprising:

an on-vehicle-user-number recognizing step that performs recognition of an on-vehicle-user-number, and stores the on-vehicle-user-number in a memory, the on-vehicle-user-number being a number of users who have got on the vehicle;

an off-vehicle-user-number recognizing step that recognizes an off-vehicle-user-number, the off-vehicle-user-number being a number of the users who have got off the vehicle after the recognition of the on-vehicle-user-number by the on-vehicle-user-number recognizing step; and a power door control step that causes at least one power door, of the plurality of power doors, to perform the closing operation when the on-vehicle-user-number stored in the memory equals the off-vehicle-user-number recognized by the off-vehicle-user-number recognizing step, the at least one power door being a power door that the users have used at a time of getting off the vehicle, wherein the method further comprises:

specifying an expected-getting-off-door for each user, of the users, who is on the vehicle so that the door-getting-off-expected-number setting unit sets a door-getting-off-expected-number for each of the expected-getting-off-door, the expected-getting-off-door being one of the plurality of power doors that the user is expected to use when getting off the vehicle, the door-getting-off-expected-number being a number of the users who are expected to use the expected-getting-off-door, recognizing a number of the users who have got off the vehicle, separately, for each of the plurality of power doors used when the users get off the vehicle; and for each of the expected-getting-off-door, performing an individual power door closing operation process when a number of the users who have got off the vehicle from the expected-getting-off-door equals the door-getting-off-expected-number, the individual power door closing operation process causing the expected-getting-off-door whose number of the users who have got off the vehicle equals the door-getting-off-expected-number to perform the closing operation, and not performing the individual power door closing operation process for each of the expected-getting-off-door whose number of the users who have got off the vehicle is different from the door-getting-off-expected-number.

10. A non-transient recording medium on which a vehicle control program for a controlling closing operation of a plurality of power doors provided in a vehicle is recorded, the program causing a computer to function as:

an on-vehicle-user-number recognizing unit that performs recognition of an on-vehicle-user-number, and stores the on-vehicle-user-number in a memory, the on-vehicle-user-number being a number of users who have got on the vehicle;

an off-vehicle-user-number recognizing unit that recognizes an off-vehicle-user-number, the off-vehicle-user-number being a number of the users who have got off the vehicle after the recognition of the on-vehicle-user-number by the on-vehicle-user-number recognizing unit;

a power door control unit that causes at least one power door, of the plurality of power doors, to perform the closing operation when the on-vehicle-user-number stored in the memory equals the off-vehicle-user-number recognized by the off-vehicle-user-number recognizing unit, the at least one power door being a power door that the users have used at a time of getting off the vehicle; and a door-getting-off-expected-number setting unit that specifies an expected-getting-off-door for each of the users who are on the vehicle so that the door-getting-off-expected-number setting unit sets a door-getting-off-expected-number for each of the expected-getting-off-door, the expected-getting-off-door being one of the plurality of power doors that a user, of the users, is expected to use when getting off the vehicle, the door-getting-off-expected-number being a number of the users who are expected to use the expected-getting-off-door, wherein the off-vehicle-user-number recognizing unit recognizes a number of the users who have got off the vehicle, separately, for each of the plurality of power doors used when the users get off the vehicle, for each of the expected-getting-off-door, the power door control unit performs an individual power door closing operation process when a number of the users who have got off the vehicle from the expected-getting-off-door equals the door-getting-off-expected-number, the individual power door closing operation process causing the expected-getting-off-door whose number of the users who have got off the vehicle equals the door-getting-off-expected-number to perform the closing operation, and the individual power door closing operation process does not occur for each of the expected-getting-off-door whose number of the users who have got off the vehicle is different from the door-getting-off-expected-number, the number of the users who have got off the vehicle being recognized by the off-vehicle-user-number recognizing unit.

11. A vehicle control device that controls a closing operation of a plurality of power doors provided in a vehicle, the vehicle control device comprising an ECU (Electronic Control Unit) that includes:

an on-vehicle-user-number recognizing unit that performs recognition of an on-vehicle-user-number, and stores the on-vehicle-user-number in a memory, the on-vehicle-user-number being a number of users who have got on the vehicle;

an off-vehicle-user-number recognizing unit that recognizes an off-vehicle-user-number, the off-vehicle-user-number being a number of the users who have got off the vehicle after the recognition of the on-vehicle-user-number by the on-vehicle-user-number recognizing unit; and a power door control unit that causes at least one power door, of the plurality of power doors, to perform the closing operation when the on-vehicle-user-number stored in the memory equals the off-vehicle-user-number recognized by the off-vehicle-user-number recognizing unit, the at least one power door being a power door that the users have used at a time of getting off the vehicle, wherein the vehicle has seats in a third and subsequent rows, the vehicle including a rear-seat power door, the rear-seat power door being a power door, of the plurality of power doors, corresponding to the seats in the third and subsequent rows, and a second row, the ECU includes a user-action recognizing unit that recognizes an action of a user, of the users, who is on the vehicle, and the power door control unit causes the rear-seat power door to perform the closing operation, when the user-action recognizing unit recognizes that all the users on the seats in the second row have got off the vehicle, and then the user-action recognizing unit recognizes that any of the users on the seats in the third and subsequent rows makes a gesture instructing the closing operation of the rear-seat power door.

* * * * *